(12) United States Patent
Shi et al.

(10) Patent No.: US 9,344,928 B2
(45) Date of Patent: May 17, 2016

(54) NEIGHBOURING CELL OPTIMIZATION METHOD AND MOBILE COMMUNICATION SYSTEM

(75) Inventors: Lirong Shi, Shenzhen (CN); Yin Gao, Shenzhen (CN); Xiang Cheng, Shenzhen (CN); Meifang He, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 716 days.

(21) Appl. No.: 13/824,675

(22) PCT Filed: Mar. 7, 2011

(86) PCT No.: PCT/CN2011/071585
§ 371 (c)(1),
(2), (4) Date: Mar. 18, 2013

(87) PCT Pub. No.: WO2011/137682
PCT Pub. Date: Nov. 10, 2011

(65) Prior Publication Data
US 2013/0183984 A1    Jul. 18, 2013

(30) Foreign Application Priority Data
May 5, 2010    (CN) .......................... 2010 1 0177497

(51) Int. Cl.
*H04W 92/22* (2009.01)
*H04W 36/00* (2009.01)

(52) U.S. Cl.
CPC .......... *H04W 36/0061* (2013.01); *H04W 92/22* (2013.01)

(58) Field of Classification Search
CPC ... H04W 76/00; H04W 36/10; H04W 36/006; H04W 92/22; H04L 67/32
USPC .............................................. 455/452.2, 450
See application file for complete search history.

(56) References Cited

U.S. PATENT DOCUMENTS 6,889,050 B1 * 5/2005 Willars .................. H04L 47/10
370/329
7,224,977 B2    5/2007 Cavalli et al.
(Continued)

FOREIGN PATENT DOCUMENTS

CN    1582054 A    2/2005
CN    1878392 A    12/2006
(Continued)

OTHER PUBLICATIONS

English abstract of CN101272596A, Sep. 24, 2008.
(Continued)

*Primary Examiner* — George Eng
*Assistant Examiner* — Joseph Dean, Jr.
(74) *Attorney, Agent, or Firm* — Porter Wright Morris & Arthur LLP

(57) ABSTRACT

The disclosure provides a neighboring cell optimization method and a mobile communication system, which belong to the communication field. The method comprises: establishing an IUR connection between a first Radio Network Controller (RNC) and a second RNC; after the IUR connection is established successfully, the first RNC sending neighboring cell information to the second RNC; and the second RNC performing automatic neighboring cell optimization according to the neighboring cell information. With the disclosure, the neighboring cell information between two RNCs is updated in time, therefore the RNC is enabled to optimize the neighboring cell in time, and a timely cell handover performed by User Equipment (UE) is ensured, which provides a basis for ensuring call continuity of the UE.

16 Claims, 6 Drawing Sheets

(56) References Cited

U.S. PATENT DOCUMENTS

| | | | | |
|---|---|---|---|---|
| 2002/0094817 | A1* | 7/2002 | Rune | H04W 92/22 455/450 |
| 2008/0254782 | A1* | 10/2008 | Nakamata | H04W 92/14 455/418 |
| 2009/0082007 | A1* | 3/2009 | De Benedittis | H04W 24/00 455/423 |

FOREIGN PATENT DOCUMENTS

| | | |
|---|---|---|
| CN | 101272596 A | 9/2008 |
| CN | 101321355 A | 12/2008 |
| JP | 2009118280 A | 5/2009 |
| KR | 20050006643 A | 1/2005 |

OTHER PUBLICATIONS

English abstract of CN1582054A, Feb. 16, 2005.
English abstract of JP2009118280A, May 28, 2009.
English abstract of KR20050006643A, Jan. 17, 2005.
English abstract of CN1878392A, Dec. 13, 2006.
English abstract of CN101321355A, Dec. 10, 2008.

\* cited by examiner

NEIGHBOURING CELL OPTIMIZATION METHOD AND MOBILE COMMUNICATION SYSTEM

TECHNICAL FIELD

The disclosure relates to the field of communications, and in particular to a neighbouring cell optimization method and a mobile communication system.

BACKGROUND

Ensuring service continuity of a mobile user is a basic function of a cellular mobile communication system, and handover of a serving cell of a mobile station is a main means of ensuring the service continuity. In order to facilitate User Equipment (UE) to perform the handover, the system needs to configure a neighbouring relationship for each cell, so that neighbouring cell information is sent to the UE in a measurement control message, the UE reports a measurement report, and a network side instructs the UE to perform the handover.

Which neighbouring cells are around a certain cell is not only related to a cell distance, but also closely related to a wireless environment where the cell is. Because the wireless environment is complicated, it is very difficult to determine exactly which neighbouring cells should be configured for a certain cell at the beginning of network planning, especially in a city environment with dense high buildings. Some other situations will cause that the neighbouring cell information is not updated in time, for example, one cell is newly added in the system or an attribute of a cell changes, but the neighbouring relationship of the cell is not updated in time, or there is change of environment or omission of a network planner.

At present, a Radio Network Controller (RNC) transfers the neighbouring cell information through a response message related to a radio link on a premise that there is UE moving to another RNC. If there is missed configuration of a neighbouring cell between two RNCs, the first UE which moves to another RNC may easily fail in handing over to another cell in time, which further causes occurrence of situations, such as an over high load of the current cell, worsened signal quality of the current cell, serious interference or call drop of a user. No effective solution has been presented for the problem that the neighbouring cell information between two RNCs is not updated in time.

SUMMARY

The disclosure provides a neighbouring cell optimization method and a mobile communication system, which can at least solve the above problem.

According to an aspect of the disclosure, a neighbouring cell optimization method is provided, which comprises: establishing an IUR connection between a first RNC and a second RNC; the first RNC sending neighbouring cell information to the second RNC after the IUR connection is established successfully; and the second RNC performing automatic neighbouring cell optimization according to the neighbouring cell information.

Preferably, the first RNC sending the neighbouring cell information to the second RNC after the IUR connection is established successfully comprises: after the IUR connection is established successfully, triggering the second RNC to send a neighbouring cell information request to the first RNC; and the first RNC sending the neighbouring cell information to the second RNC according to the neighbouring cell information request.

Preferably, the first RNC sending the neighbouring cell information to the second RNC according to the neighbouring cell information request comprises: the second RNC sending the neighbouring cell information request to the first RNC, wherein a reporting way in the neighbouring cell information request is periodic reporting, and a period of reporting is a specified length of time; and after receiving the neighbouring cell information request, the first RNC sending current neighbouring cell information to the second RNC, and then periodically sending neighbouring cell information of a current period to the second RNC according to the specified length of time.

Preferably, the first RNC sending the neighbouring cell information to the second RNC according to the neighbouring cell information request comprises: the second RNC sending the neighbouring cell information request to the first RNC, wherein a reporting way in the neighbouring cell information request is event based reporting; and after receiving the neighbouring cell information request, the first RNC sending current neighbouring cell information to the second RNC.

Preferably, the first RNC sending the neighbouring cell information to the second RNC according to the neighbouring cell information request comprises: the second RNC sending the neighbouring cell information request to the first RNC, wherein a reporting way in the neighbouring cell information request is change based reporting; and after receiving the neighbouring cell information request, the first RNC sending current neighbouring cell information to the second RNC, and then sending updated neighbouring cell information to the second RNC after each update of neighbouring cell configuration.

Preferably, the first RNC sending the neighbouring cell information to the second RNC after the IUR connection is established successfully comprises: after the IUR connection is established successfully, triggering the first RNC to send the neighbouring cell information to the second RNC actively.

Preferably, the method further comprises: the second RNC initiating handover for UE in a cell according to an automatically optimized neighbouring cell.

Preferably, the second RNC initiating the handover for the UE in the cell according to the automatically optimized neighbouring cell comprises: the second RNC sending a measurement control message to the UE in the cell, wherein the measurement control message comprises a neighboring list which is updated according to the neighbouring cell information; the UE performing measurement, and sending, when a reporting condition is met, a measurement report to the second RNC; and the second RNC making a decision according to the measurement report reported by the UE, and instructing the UE to perform handover according to the decision.

Preferably, establishing the IUR connection between the first RNC and the second RNC comprises: the first RNC and the second RNC configuring an IUR interface, and using the configured IUR interface to establish the IUR connection between the first RNC and the second RNC.

Preferably, establishing the IUR connection between the first RNC and the second RNC comprises: the first RNC sending a measurement control message to UE in a cell of the first RNC, and the second RNC sending a measurement control message to UE in a cell of the second RNC; the first RNC obtaining an IUR interface configured by the second RNC according to a measurement result returned by the UE in the cell of the first RNC, and the second RNC obtaining an IUR interface configured by the first RNC according to a measurement result returned by the UE in the cell of the second RNC;

and the first RNC using the IUR interface configured by the second RNC and the second RNC using the IUR interface configured by the first RNC, to establish the IUR connection between the first RNC and the second RNC.

According to another aspect of the disclosure, a mobile communication system is provided, comprising: a first RNC, which is configured to establish an IUR connection with a second RNC, and send neighbouring cell information to the second RNC after the IUR connection is established successfully; and the second RNC, which is configured to perform automatic neighbouring cell optimization according to the neighbouring cell information.

Preferably, the second RNC comprises: a request sending module, which is configured to, after the IUR connection is established successfully, trigger sending of a neighbouring cell information request to the first RNC; and a first information receiving module, which is configured to receive the neighbouring cell information returned by the first RNC; the first RNC comprises: a request receiving module, which is configured to receive the neighbouring cell information request sent by the second RNC; and a first information sending module, which is configured to send the neighbouring cell information to the second RNC according to the neighbouring cell information request.

Preferably, the first RNC comprises: a second information sending module, which is configured to, after the IUR connection is established successfully, trigger to send the neighbouring cell information to the second RNC actively; the second RNC comprises: a second information receiving module, which is configured to receive the neighbouring cell information returned by the first RNC.

Preferably, the second RNC comprises: a handover module, which is configured to initiate handover for UE in a cell according to an automatically optimized neighbouring cell.

With the disclosure, the first RNC provides the neighbouring cell information to the second RNC after the IUR connection between the first RNC and the second RNC is established successfully, which prevents the situation that there is missed configuration of the neighbouring cell information on the second RNC, solves the problem that the neighbouring cell information between two RNCs cannot be updated in time, and provides a basis for ensuring call continuity of the UE.

BRIEF DESCRIPTION OF THE DRAWINGS

Drawings, provided for further understanding of the disclosure and forming a part of the specification, are used to explain the disclosure together with embodiments of the disclosure rather than to limit the disclosure, wherein.

DETAILED DESCRIPTION OF THE EMBODIMENTS

The disclosure is described below with reference to the accompanying drawings and embodiments in detail. Note that, the embodiments of the disclosure and the features of the embodiments can be combined with each other if there is no conflict.

A mobile communication system comprises multiple RNCs and UEs. There is a wireless connection between each two RNCs and between the RNC and the UE, and the wireless connection follows the regulation in a related communication standard. Each embodiment of the disclosure described below is implemented based on the wireless communication system.

Embodiment 1

Figure 1:
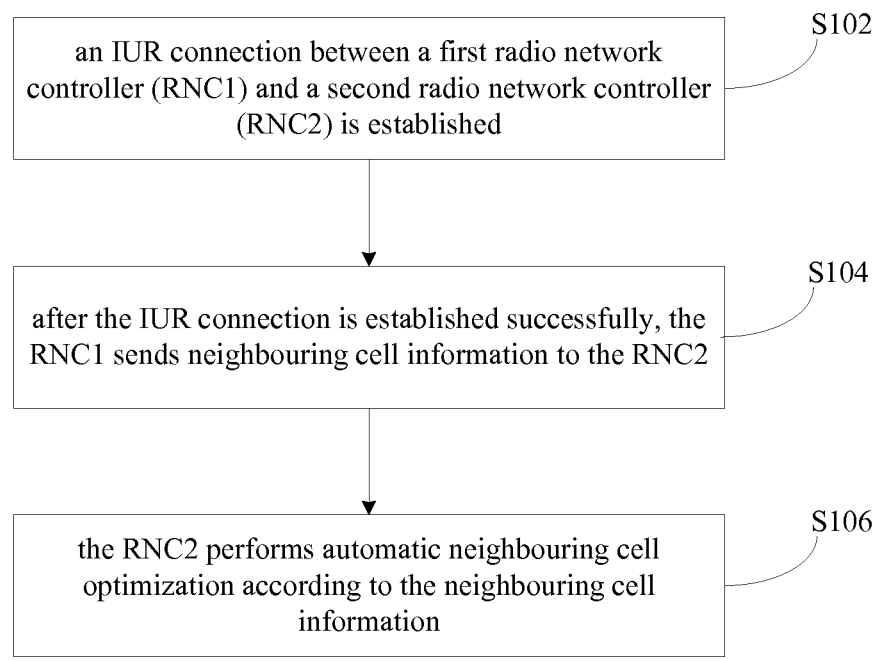
FIG. 1 shows a flowchart of a neighbouring cell optimization method according to embodiment 1 of the disclosure.

FIG. 1 shows a flowchart of a neighbouring cell optimization method according to an embodiment of the disclosure, comprising the following steps.

Step S102: an IUR connection is established between a first radio network controller (RNC1) and a second radio network controller (RNC2).

For example, the RNC1 and the RNC2 configure an IUR interface, and use the configured IUR interface to establish the IUR connection. The IUR interface is a logic interface between two RNCs and is configured to transmit control signaling and user data between the two RNCs.

Step S104: after the IUR connection is established successfully, the RNC1 sends neighbouring cell information to the RNC2.

For example, after the IUR connection is established successfully, the RNC2 sends a neighbouring cell information request to the RNC1; and the RNC1 sends the neighbouring cell information to the RNC2 according to the neighbouring cell information request. The neighbouring cell information request may be an Information Exchange Initiation Request message sent by the RNC2 or a newly added neighbouring cell information request message sent by the RNC2. The message may comprise the number of requested cells (RequestedCellNum), for example, assuming that the range of the number is 1-65535, if RequestedCellNum is set as 65535 (or another specific value), it is indicated that the neighbouring cells of all cells of the RNC1 need to be reported.

After the RNC2 is electrified and the IUR connection between the RNC1 and the RNC2 is established successfully, the RNC2 sends a request message to the RNC1, or an Operation and Maintenance Center (OMC) triggers the RNC2 to send the request message to the RNC1, so as to prevent missed configuration of neighbouring cells.

Step S106: the RNC2 performs automatic neighbouring cell optimization according to the neighbouring cell information.

The RNC2 in the step may further initiate handover for UE in a current cell according to an automatically optimized neighbouring cell, or initiate handover for the UE in the current cell according to the received neighbouring cell information directly.

The neighbouring cell information transfer between two RNCs in related technologies is performed on a premise that there is UE moving to another RNC, but the neighbouring cell information transfer between two RNCs in the embodiment of the disclosure is performed after the IUR connection is established successfully and before any UE performs cell handover. Moreover, the neighbouring cell information transfer in related technologies is performed through a response message related to a radio link, but the neighbouring cell information transfer in the embodiment of the disclosure is performed without any need of using the response message related to the radio link, in embodiment of the disclosure, the neighbouring cell information can be transferred by using an existing message, for example, Information Exchange Initiation Response, or by using a newly added message, for example, Neighbouring Cell Information Response.

In the embodiment, the RNC1 is triggered to provide the neighbouring cell information to the RNC2 after the IUR connection between the RNC1 and the RNC2 is established successfully, which prevents the situation that there is missed configuration of the neighbouring cell information on the RNC2, solves the problem that the neighbouring cell information cannot be updated in time between two RNCs, and provides a basis for ensuring call continuity of the UE. Moreover, load distribution of a cell is optimized, signal quality is improved, and user experience is enhanced.

The request message sent to the RNC1 by the RNC2 may comprise a type of the request, for example, when the type of the request is neighbouring cell information, it is indicated that the request message is the neighbouring cell information request. At the same time, the request message may also comprise a reporting way, wherein the reporting way comprises periodic reporting, event based reporting and change based reporting. The RNC1 sends the neighbouring cell information to the RNC2 through a reporting message according to the reporting way (periodically reporting or reporting during update of neighbouring cell configuration). The three reporting ways will be described below.

Embodiment 2

Figure 2:
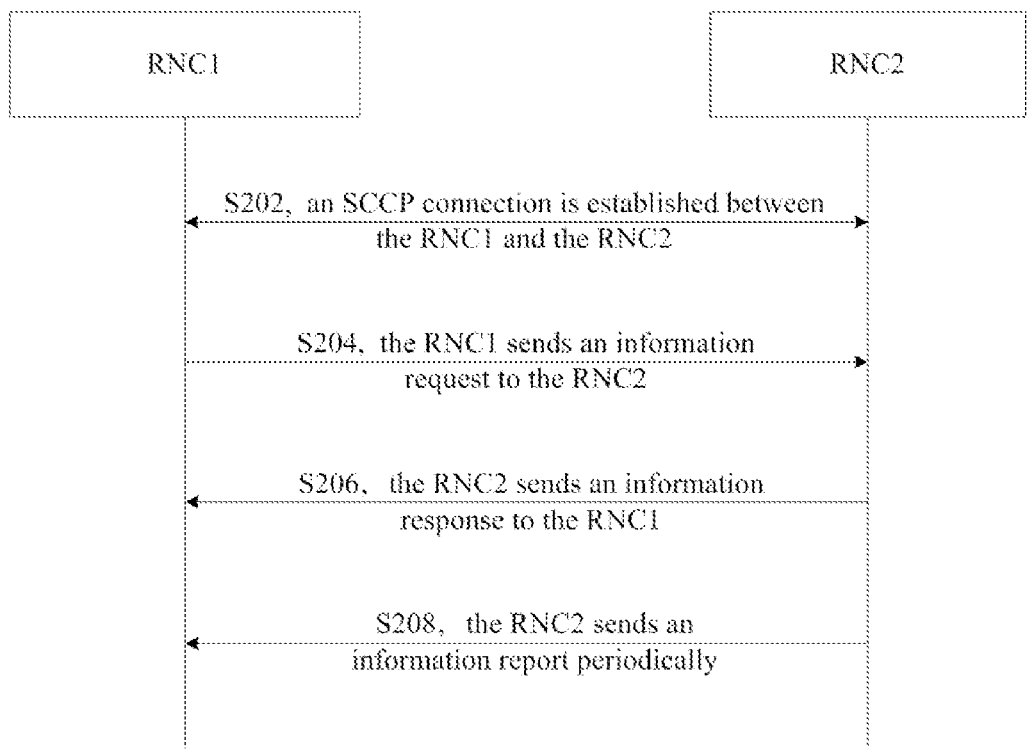
FIG. 2 shows a flowchart of a method for reporting neighbouring cell information in a periodic reporting way according to embodiment 2 of the disclosure.

The embodiment is described by taking the periodic reporting way for example. With reference to FIG. 2, the method for reporting the neighbouring cell information in the periodic reporting way comprises the following steps.

Step S202: the RNC1 and the RNC2 configure an IUR interface office direction, and a Signaling Connection Control Part (SCCP) connection between the RNC1 and the RNC2 is established successfully.

The SCCP (No. 7 signaling) connection is a connection of a radio network layer and a transport layer. The process of configuring the IUR interface office direction between two RNCs means the process that one RNC configures information of the other RNC, such as a physical identity. The process of establishing the connection is the process of establishing a physical connection, namely the physical connection through which the RNCs can communicate with each other.

Step S204: the RNC2 sends an Information Exchange Initiation Request message or a newly added Neighbouring Cell Information Request message to the RNC1.

In the embodiment, a requested exchange type in the request message is set to cell, an information type is neighbouring cell information, which indicates that the request message is a neighbouring cell information request. The RequestedCellNum is set as 1, and the message comprises an identity of only one cell. The reporting way is set as periodic reporting, and the period is set as 24 hours.

Step S206: after receiving the request message, the RNC1 reports the neighbouring cell information of one cell identified in the request message. During specific reporting, it is feasible to report through an existing message, for example, Information Exchange Initiation Response, or a newly added message, for example, Neighbouring Cell Information Response.

Step S208: the RNC1 sets a timer, and periodically sends information report to the RNC2. In the embodiment, the neighbouring cell information of this cell is reported to the RNC2 every 24 hours through an existing message, for example, Information Report, or a newly added message, for example, Neighbouring Cell Information Report.

By periodically reporting the neighbouring cell information of the specified cell to the opposite RNC, the embodiment can update the neighbouring cell information of the cell in the opposite RNC in time and prevent the situation that there is missed neighbouring cell configuration of the cell, thereby improving the signal quality of the cell and the performance of the system.

Embodiment 3

Figure 3:
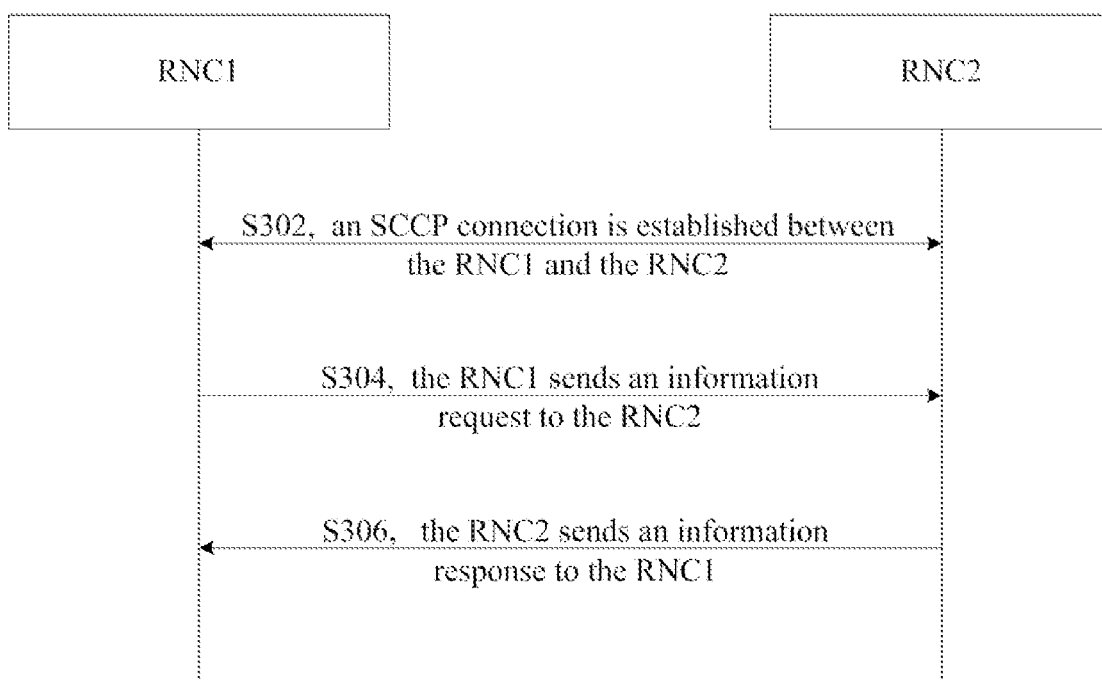
FIG. 3 shows a flowchart of a method for reporting neighbouring cell information in an event based reporting way according to embodiment 3 of the disclosure.

The embodiment is described by taking the event based reporting way for example. With reference to FIG. 3, the method for reporting the neighbouring cell information in the event based reporting way comprises the following steps.

Step S302: the RNC1 and the RNC2 configure an IUR interface office direction, and an SCCP connection between the RNC1 and the RNC2 is established successfully.

Step S304: the RNC2 sends an Information Exchange Initiation Request message or a newly added Neighbouring Cell Information Request message to the RNC1.

In the embodiment, a requested exchange type in the request message is set to cell, an information type is neighbouring cell, which indicates that the request message is a neighbouring cell information request. The RequestedCellNum is set as 5, and the message comprises identities of five cells. The reporting way is set as event based reporting.

Step S306: after receiving the request message, the RNC1 reports the neighbouring cell information corresponding to the five cells through an existing message, for example, Information Exchange Initiation Response, or a newly added message, for example, Neighbouring Cell Information Response.

By reporting the neighbouring cell information of the specified cells to the opposite RNC in the event based reporting way (namely reporting after receiving the neighbouring cell information request each time), the embodiment can update the neighbouring cell information of the specified cells in the opposite RNC in time and prevent the situation that there is missed neighbouring cell configuration of the specified cell, thereby improving the signal quality of the specified cells and the performance of the system.

Embodiment 4

Figure 4:
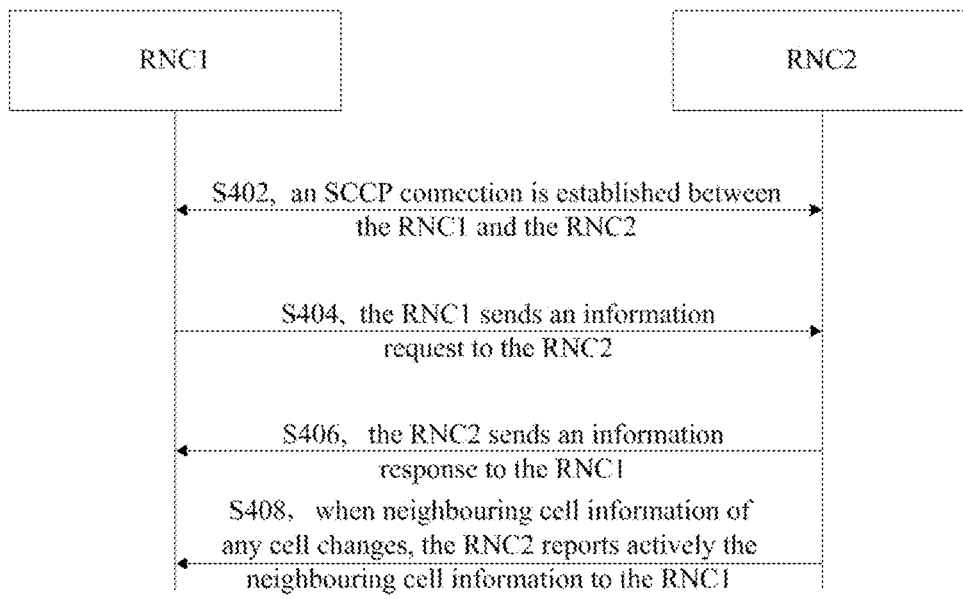
FIG. 4 shows a flowchart of a method for reporting neighbouring cell information in a change based reporting way according to embodiment 4 of the disclosure.

The embodiment is described by taking the change based reporting way for example. With reference to FIG. 4, the method for reporting the neighbouring cell information in the change based reporting way comprises the following steps.

Step S402: the RNC1 and the RNC2 configure an IUR interface office direction, and an SCCP connection between the RNC1 and the RNC2 is established successfully.

Step S404: the RNC2 sends an Information Exchange Initiation Request message or a newly added Neighbouring Cell Information Request message to the RNC1.

In the embodiment, a requested exchange type in the request message is set to cell, an information type is neighbouring cell, which indicates that the request message is a neighbouring cell information request. The Requested-CellNum is set as 65535, and the message does not need to comprise any cell identity. The reporting way is set as change based reporting.

Step S406: after receiving the request message, the RNC1 reports the neighbouring cell information of all cells through an existing message, for example, Information Exchange Initiation Response, or a newly added message, for example, Neighbouring Cell Information Response.

Step S408: when the neighbouring cell information of any cell changes, the RNC1 reports actively the updated neighbouring cell information of the cell to the RNC2 through an existing message, for example, Information Report, or a newly added message, for example, Neighbouring Cell Information Report; at the same time, the message comprises the identity of the cell whose neighbouring cell information changes.

By reporting the neighbouring cell information of the specified cell to the opposite RNC in the change based reporting way (namely reporting when there is neighbouring cell information of the cell changing each time), the embodiment can update the neighbouring cell information of the specified cell in the opposite RNC in time and prevent the situation that there is missed neighbouring cell configuration of the specified cell, thereby improving the signal quality of the specified cell and the performance of the system.

Embodiment 5

Figure 5:
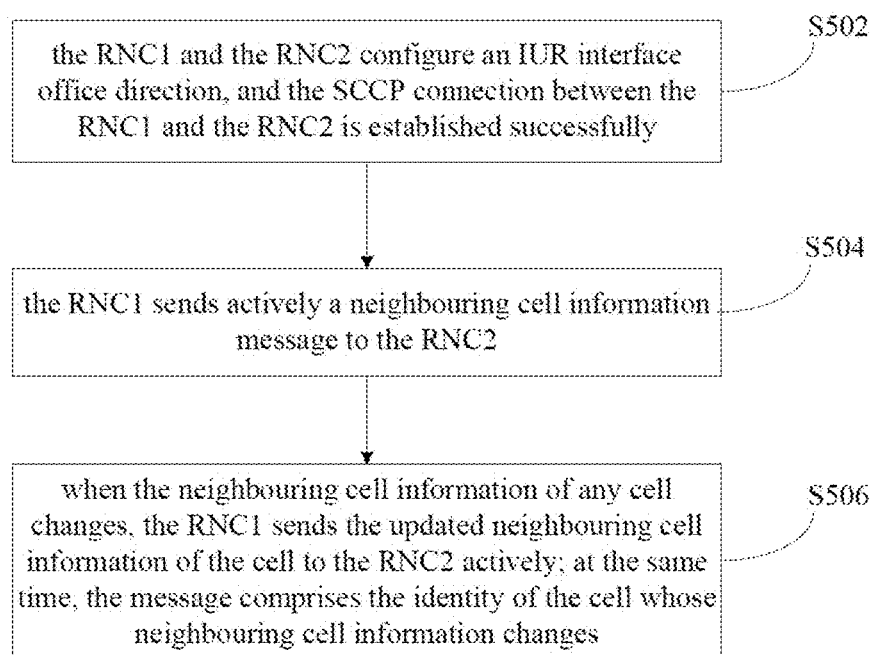
FIG. 5 shows a flowchart of a method for actively reporting neighbouring cell information according to embodiment 5 of the disclosure.

In the embodiment, the RNC1 sends the neighbouring cell information to the RNC2 actively. With reference to FIG. 5, the method for actively reporting neighbouring cell information comprises the following steps.

Step S502: the RNC1 and the RNC2 configure an IUR interface office direction, and an SCCP connection between the RNC1 and the RNC2 is established successfully.

Step S504: the RNC1 sends a neighbouring cell information message to the RNC2 actively, wherein the message can be a newly added message, for example, Neighbouring Cell Information Report, or an existing message, for example, Information Report.

In the step, the reported message comprises the identity of one or more cells, and the neighbouring cell information corresponding to each cell. The neighbouring cell information comprises, but not limited to, the identity of the cell, uplink and downlink carrier frequency, and Primary Scrambling Code (PSC). The reported message in the embodiment comprises the neighbouring cell information of the specified cell in the RNC1, namely the reported message comprises the identity of the specified cell and the corresponding neighbouring cell information.

Step S506: when the neighbouring cell information of any cell changes, the RNC1 sends the updated neighbouring cell information of the cell to the RNC2 actively; at the same time, the message comprises the identity of the cell whose neighbouring cell information changes.

By reporting the neighbouring cell information of the specified cell to the opposite RNC in the active reporting way, the embodiment can update the neighbouring cell information of the specified cell in the opposite RNC in time and prevent the situation that there is missed neighbouring cell configuration of the specified cell, thereby improving the signal quality of the specified cell and the performance of the system.

Embodiment 6

Figure 6:
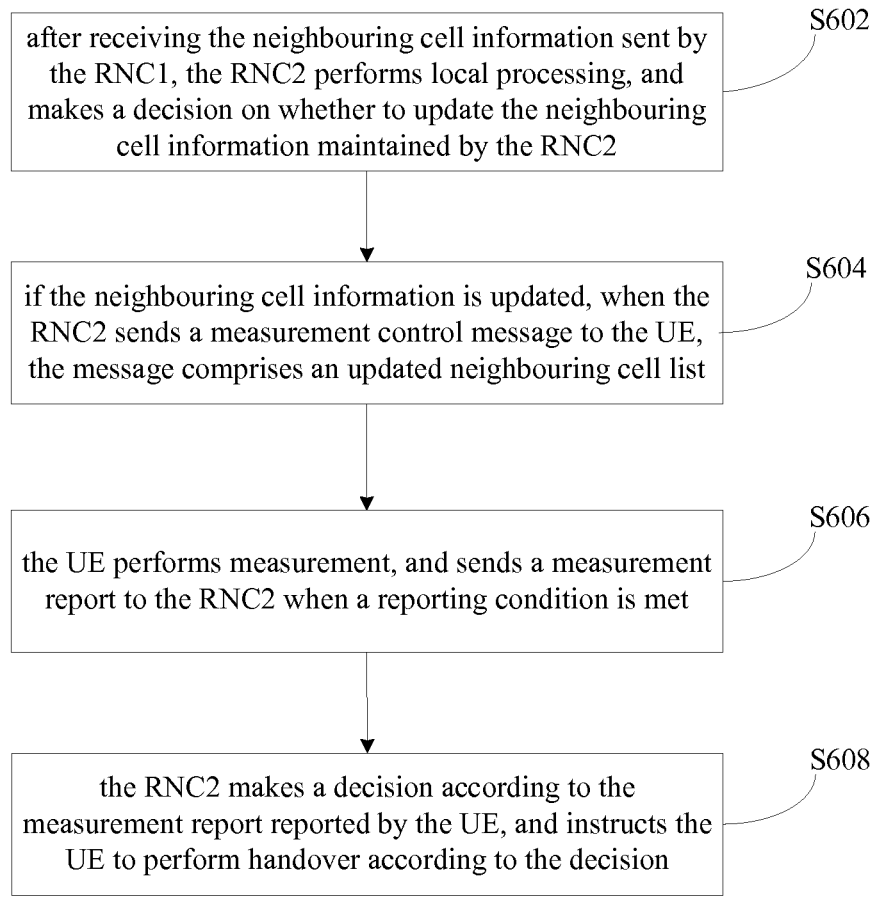
FIG. 6 shows a flowchart of a method for initiating handover for UE according to embodiment 6 of the disclosure.

The RNC2 performs corresponding processing after receiving the neighbouring cell information. For example, the RNC2 performs local processing and making a decision on whether to update the neighbouring cell information, and further initiates the handover for the UE; or the RNC2 may also directly make a decision on whether to perform handover according to the reported neighbouring cell. With reference to FIG. 6, the description is based on the example that the RNC2 initiates handover for the UE after receiving the neighbouring cell information. The method for initiating handover for the UE according to the neighbouring cell information comprises the following steps.

Step S602: after receiving the neighbouring cell information sent by the RNC1, the RNC2 performs local processing, and makes a decision on whether to update the neighbouring cell information maintained by the RNC2.

Step S604: if the neighbouring cell information is updated, when the RNC2 sends a measurement control message to the UE, the message comprises an updated neighbouring cell list.

Step S606: the UE performs measurement, and sends a measurement report to the RNC2 when a reporting condition is met, wherein the reporting condition may be either a default reporting condition of the system, or realized by referring to related technologies.

Step S608: the RNC2 makes a decision according to the measurement report reported by the UE, and instructs the UE to perform handover according to the decision.

Figure 7:
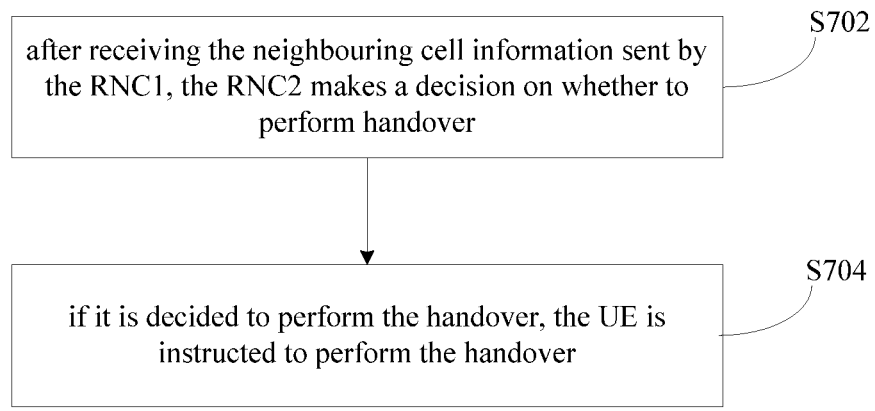
FIG. 7 shows a flowchart of another method for initiating handover for UE according to embodiment 6 of the disclosure.

With reference to FIG. 7, the description is based on the example that the RNC2 initiates handover for the UE after receiving the neighbouring cell information. The method for initiating handover for the UE comprises the following steps.

Step S702: after receiving the neighbouring cell information sent by the RNC1, the RNC2 makes a decision on whether to perform handover, wherein the specific method for making a decision on whether to perform the handover can be implemented by using related technologies, and it will not be described in detail here.

Step S704: if it is decided to perform the handover, the UE is instructed to perform the handover.

In the embodiment, the RNC2 initiates the handover for the UE in the cell according to the received neighbouring cell information. Because the neighbouring cell information is the updated neighbouring cell information, the situation of missed neighbouring cell configuration is prevented, thereby enabling the UE to perform cell handover successfully, and solving the problem of call drop.

Embodiment 7

Figure 8:
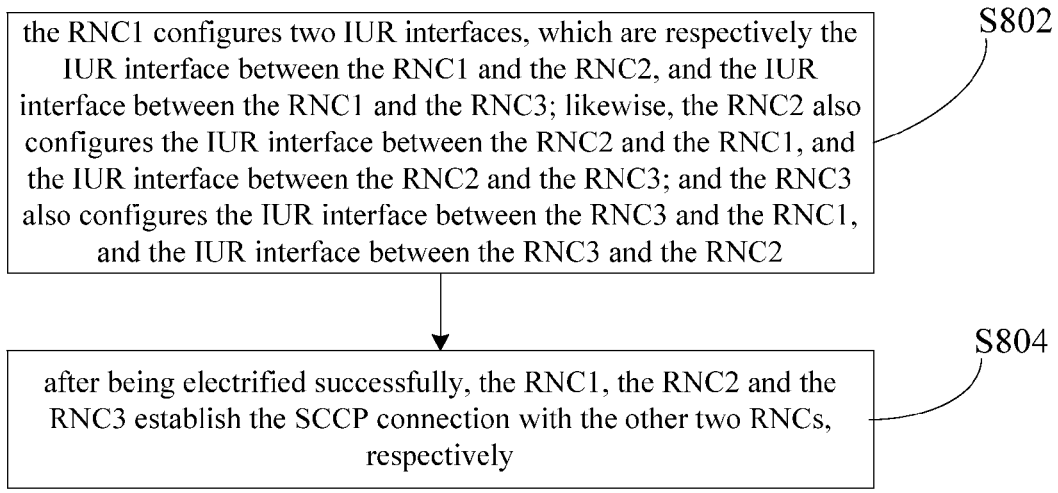
FIG. 8 shows a flowchart of a method for establishing an IUR interface connection according to embodiment 7 of the disclosure.

The method for establishing an IUR interface connection between two RNCs in the above embodiments can be implemented by network planning or measuring and reporting by the UE and other ways. FIG. 8 shows a flowchart of a method for establishing the IUR interface connection through the network planning according to the embodiment of the disclosure. In the network planning shown in FIG. 8, three RNCs are planned in one geographic region, wherein the three RNCs are respectively RNC1, RNC2 and RNC3, and the UE can perform handover among these RNCs. The method for establishing the IUR interface connection comprises the following steps.

Step S802: the RNC1 configures two IUR interfaces, which are respectively the IUR interface between the RNC1 and the RNC2, and the IUR interface between the RNC1 and the RNC3. Likewise, the RNC2 also configures the IUR interface between the RNC2 and the RNC1, and the IUR interface between the RNC2 and the RNC3; and the RNC3 also configures the IUR interface between the RNC3 and the RNC1, and the IUR interface between the RNC3 and the RNC2.

Step S804: after being electrified successfully, the RNC1, the RNC2 and the RNC3 establish the SCCP connection with the other two RNCs, respectively.

Figure 9:
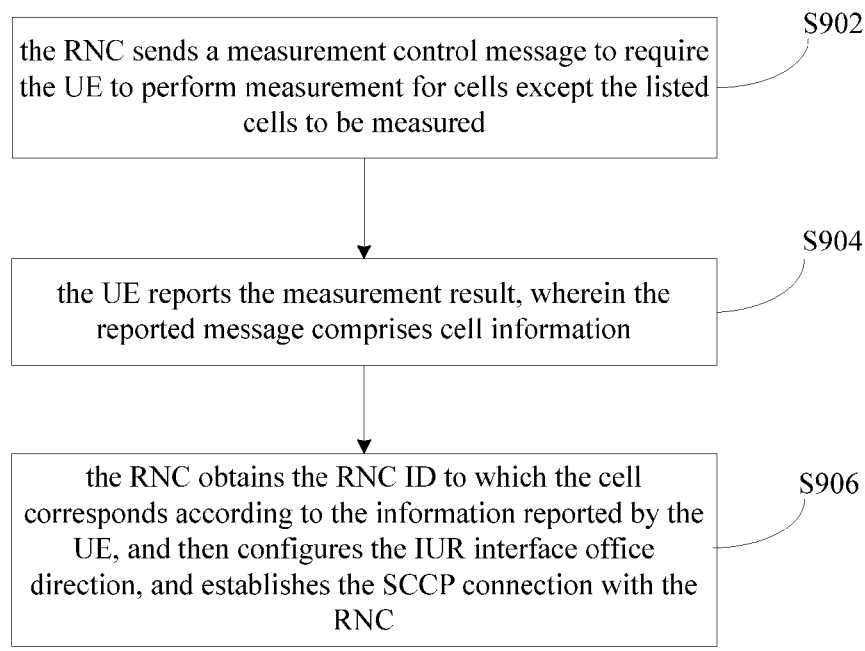
FIG. 9 shows a flowchart of another method for establishing an IUR interface connection according to embodiment 7 of the disclosure.

FIG. 9 shows a flowchart of a method for establishing the IUR interface connection through measuring and reporting by the UE according to the embodiment of the disclosure, comprising the following steps.

Step S902: the RNC sends a measurement control message to require the UE to perform measurement for cells except monitor set cells (listed cells to be measured).

The monitor set cells are the cells listed in the measurement control message; the UE is required to measure the quality of these cells. However, in the embodiment, the UE is required to measure the quality of the cells except the listed cells to be measured, namely inter-frequency cells and/or inter-system cells except the monitor set cells.

Step S904: the UE reports the measurement result, wherein the reported message comprises cell information. The cell information specifically comprises PSC, optional cell identity, optional Public Land Mobile Network (PLMN) identity, optional Location Area Code (LAC) and optional Routing Area Code (RAC).

Step S906: the RNC obtains an RNC identity, namely RNC ID, to which the cell corresponds according to the information reported by the UE, and then configures the IUR interface office direction, and establishes the SCCP connection with the RNC.

The embodiment provides two specific ways of establishing the IUR connection. After the connection is established, the RNC can transfer the neighbouring cell information by using the method in the above embodiments, and initiate handover for the UE according to the received neighbouring cell information. In this way, the situation of missed neighbouring cell configuration is prevented, thereby solving the problem of call drop, and improving the performance of the system.

Embodiment 8

Figure 10:
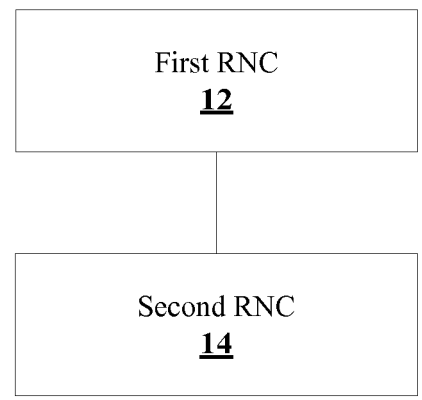
FIG. 10 shows a structural block diagram of a mobile communication system according to embodiment 8 of the disclosure.

FIG. 10 shows a structural block diagram of a mobile communication system according to the embodiment of the disclosure. The mobile communication system comprises:

a first RNC12, which is configured to establish an IUR connection with a second RNC, and send neighbouring cell information to the second RNC after the IUR connection is established successfully; and a second RNC14, which is configured to perform automatic neighbouring cell optimization according to the neighbouring cell information.

In the embodiment, the first RNC12 is triggered to provide the neighbouring cell information to the second RNC14 after the IUR connection between the first RNC12 and the second RNC14 is established successfully, which prevents the situation that there is missed configuration of the neighbouring cell information on the second RNC14, solves the problem that the first UE cannot hand over to another cell in time when moving to the second RNC14, thereby load distribution of a cell is optimized, signal quality is improved, and user experience is enhanced.

After the IUR connection is established successfully, there are two triggering ways for sending the neighbouring cell information. The first way is to trigger the second RNC14 to send a neighbouring cell information request to the first RNC12, so that the first RNC12 provides the neighbouring cell information. The second way is to trigger the first RNC12 to provide the neighbouring cell information to the second RNC14 actively.

For the first way, the second RNC14 comprises: a request sending module, which is configured to, after the IUR connection is established successfully, trigger sending of a neighbouring cell information request to the first RNC12; a first information receiving module, which is configured to receive the neighbouring cell information returned by the first RNC12; the first RNC12 comprises: a request receiving module, which is configured to receive the neighbouring cell information request sent by the second RNC14; a first information sending module, which is configured to send the neighbouring cell information to the second RNC14 according to the neighbouring cell information request.

The neighbouring cell information request sent to the first RNC12 by the second RNC 14 may be a request message. The request message may comprise a type of the request, for example, when the type of the request is neighbouring cell information, it is indicated that the request message is the neighbouring cell information request. At the same time, the request message may also comprise a reporting way, wherein the reporting way comprises periodic reporting, event based reporting and change based reporting. The first RNC12 sends the neighbouring cell information to the second RNC14 through a reporting message according to the reporting way (periodically reporting or reporting during update of neighbouring cell configuration). The specific way of sending the neighbouring cell information can refer to the methods in embodiments 2 to 4, and it will not be described in detail here.

For the second way, the first RNC12 comprises: a second information sending module, which is configured to, after the IUR connection is established successfully, trigger active sending of the neighbouring cell information to the second RNC14; the second RNC14 comprises: a second information receiving module, which is configured to receive the neighbouring cell information returned by the first RNC12.

The second RNC14 comprises: a handover module, which is configured to initiate handover for UE in a cell according to an automatically optimized neighbouring cell.

The process of establishing the IUR connection between the first RNC12 and the second RNC14 can be implemented by the method provided in embodiment 7, so it will not be described in detail here.

The method that the second RNC14 initiates handover for the UE in the cell according to the neighbouring cell information can be implemented by the method provided in embodiment 6, so it will not be described in detail here.

It can be concluded from the above description that the disclosure achieves the following technical effects: in the above embodiments, by triggering sending of the neighbouring cell information after the IUR connection between two RNCs is established successfully, the neighbouring cell information between two RNCs is updated in time, therefore the UE is enabled to perform cell handover in time, which effectively ensures call continuity of the UE.

Obviously, those skilled in the art shall understand that the above-mentioned modules and steps of the disclosure can be realized by using general purpose calculating device, can be integrated in one calculating device or distributed on a network which consists of a plurality of calculating devices. Alternatively, the modules and the steps of the disclosure can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the disclosure is not restricted to any particular hardware and software combination.

The descriptions above are only the preferable embodiment of the disclosure, which are not used to restrict the disclosure. For those skilled in the art, the disclosure may have various changes and variations. Any amendments, equivalent substitutions, improvements, etc. within the principle of the disclosure are all included in the scope of the protection of the disclosure.

What is claimed is:

1. A neighbouring cell optimization method, comprising:
    establishing an IUR connection between a first Radio Network Controller (RNC) and a second RNC;
    the first RNC sending neighbouring cell information to the second RNC after the IUR connection is established successfully; and
    the second RNC performing automatic neighbouring cell optimization according to the neighbouring cell information;
wherein the first RNC sending the neighbouring cell information to the second RNC after the IUR connection is established successfully comprises, after the IUR connection is established successfully, the second RNC sending a neighbouring cell information request to the first RNC, and the first RNC sending the neighbouring cell information to the second RNC according to the neighbouring cell information request; and
further wherein the first RNC sending the neighbouring cell information to the second RNC according to the neighbouring cell information request comprises the second RNC sending the neighbouring cell information request to the first RNC, wherein a reporting way in the neighbouring cell information request is periodic reporting, and a period of reporting is a specified length of time, and after receiving the neighbouring cell information request, the first RNC sending current neighbouring cell information to the second RNC, and then periodically sending neighbouring cell information of a current period to the second RNC according to the specified length of time.

2. The method according to claim 1, wherein the first RNC sending the neighbouring cell information to the second RNC after the IUR connection is established successfully comprises:
    after the IUR connection is established successfully, the first RNC sending the neighbouring cell information to the second RNC actively.

3. The method according to claim 1, further comprising: the second RNC initiating handover for User Equipment (UE) in a cell according to an automatically optimized neighbouring cell.

4. The method according to claim 3, wherein the second RNC initiating the handover for the UE in the cell according to the automatically optimized neighbouring cell comprises:
    the second RNC sending a measurement control message to the UE in the cell, wherein the measurement control message comprises a neighbouring list which is updated according to the neighbouring cell information;
    the UE performing measurement, and sending, when a reporting condition is met, a measurement report to the second RNC; and
    the second RNC making a decision according to the measurement report reported by the UE, and instructing the UE to perform handover according to the decision.

5. The method according to claim 1, wherein establishing the IUR connection between the first RNC and the second RNC comprises:
    the first RNC and the second RNC configuring an IUR interface, and using the configured IUR interface to establish the IUR connection between the first RNC and the second RNC.

6. The method according to claim 1, wherein establishing the IUR connection between the first RNC and the second RNC comprises:
    the first RNC sending a measurement control message to UE in a cell of the first RNC, and the second RNC sending a measurement control message to UE in a cell of the second RNC;
    the first RNC obtaining an IUR interface configured by the second RNC according to a measurement result returned by the UE in the cell of the first RNC, and the second RNC obtaining an IUR interface configured by the first RNC according to a measurement result returned by the UE in the cell of the second RNC; and
    the first RNC using the IUR interface configured by the second RNC and the second RNC using the IUR interface configured by the first RNC, to establish the IUR connection between the first RNC and the second RNC.

7. The method according to claim 1, wherein the neighbouring cell information request sent from the second RNC to the first RNC is an Information Exchange Initiation Request message or a newly added neighbouring cell information request message.

8. The method according to claim 1, wherein a message through which the first RNC sends the neighbouring cell information to the second RNC according to the neighbouring cell information request is an existing message or a newly added message, wherein the existing message is an Information Exchange Initiation Response message, and the newly added message is a Neighbouring Cell Information Response message.

9. The method according to claim 1, wherein a requested exchange type in the neighbouring cell information request is set to cell, an information type is set to neighbouring cell.

10. The method according to claim 1, wherein a message for sending the neighbouring cell information comprises the neighbouring cell information.

11. The method according to claim 1, further comprising: the second RNC initiating handover for User Equipment (UE) in a cell according to an automatically optimized neighbouring cell.

12. The method according to claim 1, further comprising: the second RNC initiating handover for User Equipment (UE) in a cell according to an automatically optimized neighbouring cell.

13. A mobile communication system, comprising:
    a first Radio Network Controller (RNC), which is configured to establish an IUR connection with a second RNC, and send neighbouring cell information to the second RNC after the IUR connection is established successfully; and
    the second RNC, which is configured to perform automatic neighbouring cell optimization according to the neighbouring cell information;

wherein the second RNC is configured to send a neighbouring cell information request to the first RNC, wherein a reporting way in the neighbouring cell information request is periodic reporting, and a period of reporting is a specified length of time; and further wherein the first RNC is configured such that, after receiving the neighbouring cell information request, the first RNC sends current neighbouring cell information to the second RNC, and then periodically sends neighbouring cell information of a current period to the second RNC according to the specified length of time.

14. The system according to claim 13, wherein the second RNC comprises a hardware processor configured to execute the following modules: a request sending module, which is configured to, after the IUR connection is established successfully, send a neighbouring cell information request to the first RNC; and a first information receiving module, which is configured to receive the neighbouring cell information returned by the first RNC;

the first RNC comprises a hardware processor configured to execute the following modules: a request receiving module, which is configured to receive the neighbouring cell information request sent by the second RNC; and a first information sending module, which is configured to send the neighbouring cell information to the second RNC according to the neighbouring cell information request.

15. The system according to claim 13, wherein the first RNC comprises a hardware processor configured to execute the following modules: a second information sending module, which is configured to, after the IUR connection is established successfully, send the neighbouring cell information to the second RNC actively;

the second RNC comprises a hardware processor configured to execute the following modules: a second information receiving module, which is configured to receive the neighbouring cell information returned by the first RNC.

16. The system according to claim 13, wherein the second RNC comprises a hardware processor configured to execute the following modules: a handover module, which is configured to initiate handover for User Equipment (UE) in a cell according to an automatically optimized neighbouring cell.

\* \* \* \* \*